Figure 1:
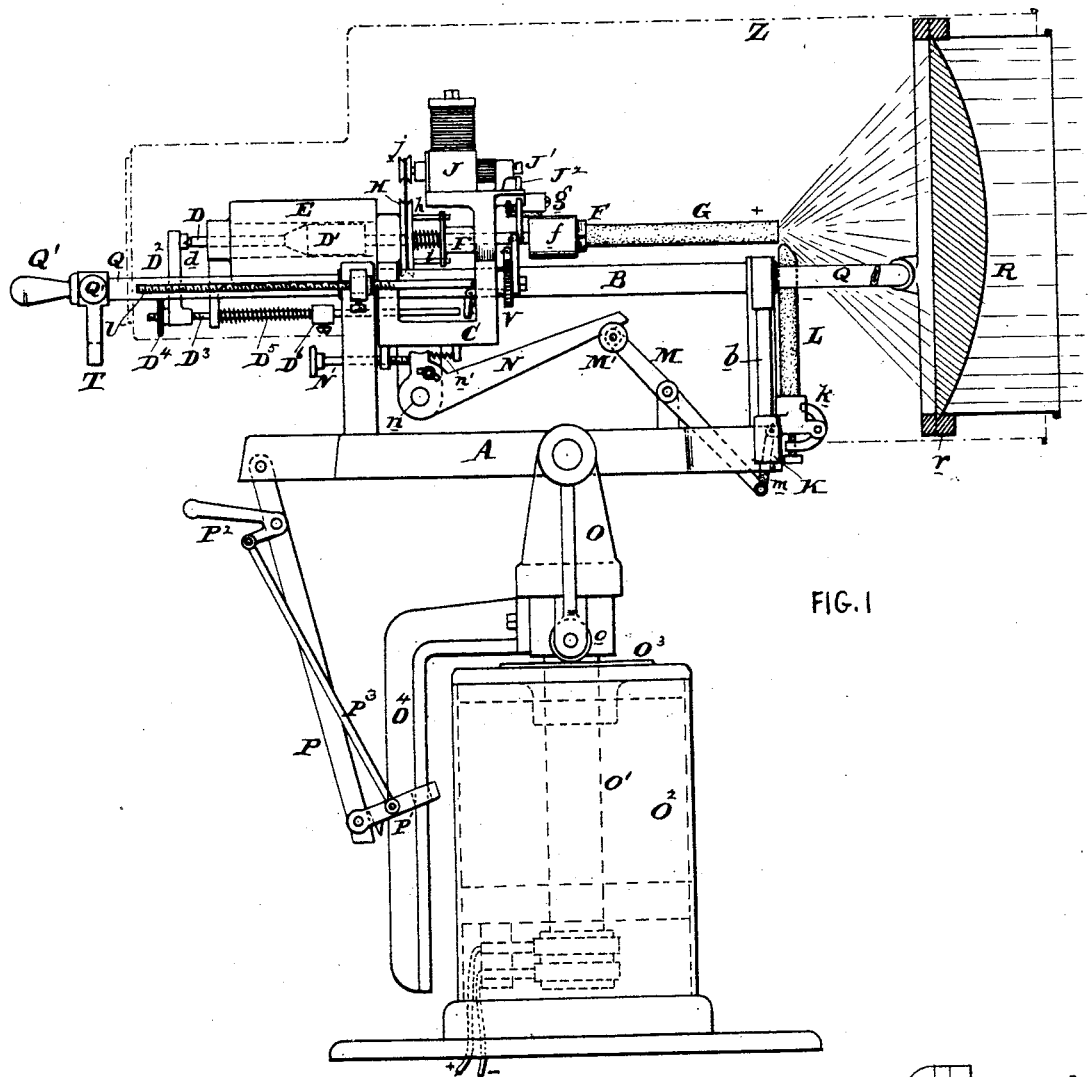

(No Model.)

R. M. HUNTER.
ELECTRIC ARC LAMP.

No. 514,229.

2 Sheets—Sheet 1.

Patented Feb. 6, 1894.

Attest
Inventor (No Model.) 2 Sheets—Sheet 2.
R. M. HUNTER.
ELECTRIC ARC LAMP.
No. 514,229. Patented Feb. 6, 1894.
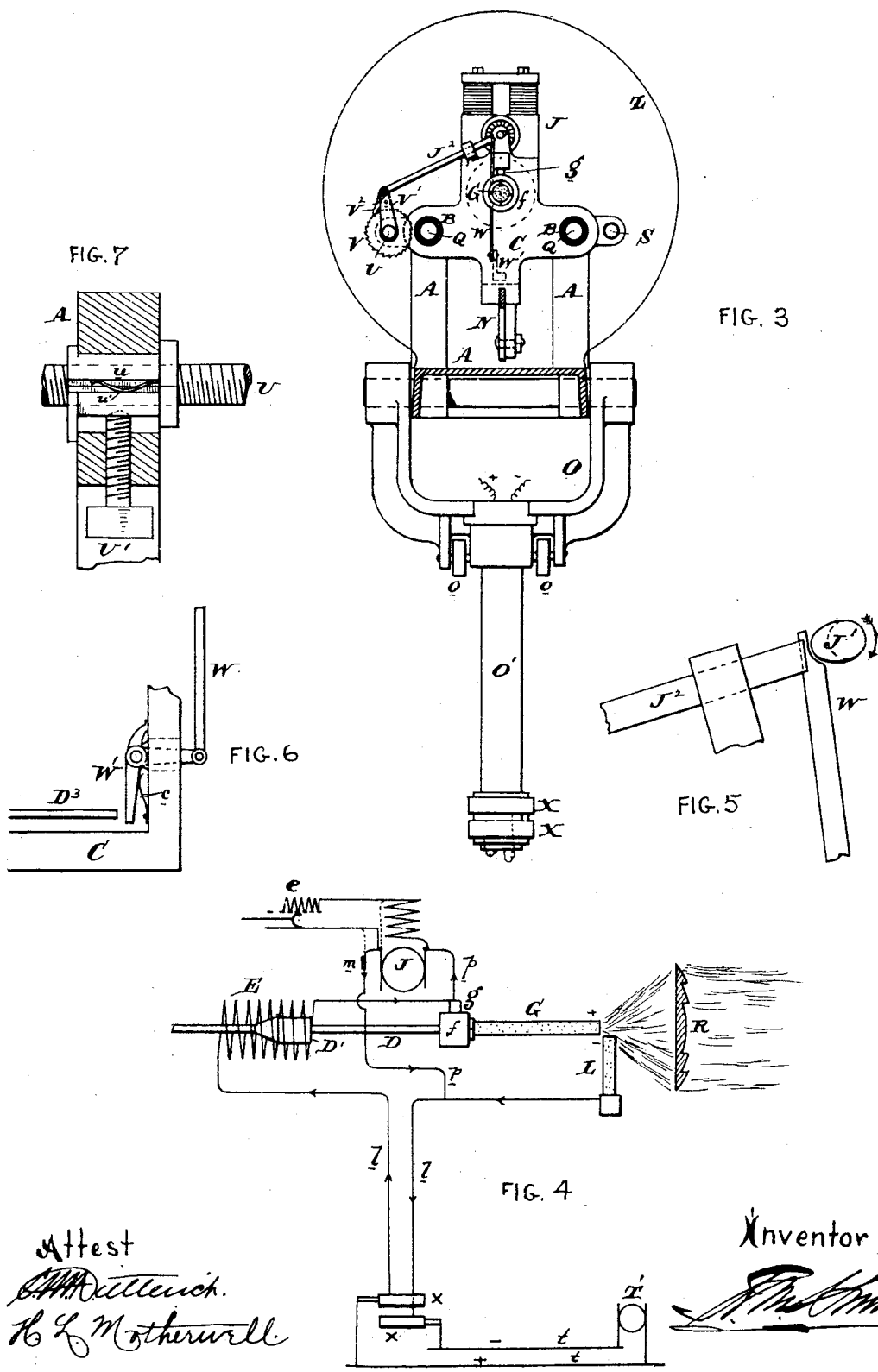

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC-ARC LAMP.

SPECIFICATION forming part of Letters Patent No. 514,229, dated February 6, 1894.

Application filed May 9, 1893. Serial No. 473,597. (No model.)

*To all whom it may concern:*

Be it known that I, RUDOLPH M. HUNTER, of the city and county of Philadelphia, State of Pennsylvania, have invented an Improvement in Electric-Arc Lamps, of which the following is a specification.

My invention has reference to electric arc lamps, and consists of certain improvements which are fully set out in the following specification and shown in the accompanying drawings which form a part thereof.

This application, Case No. 251, comprehends certain improvements in arc lamps especially adapted for use as search lights, where the beam of light is to be projected in one direction, and preferably concentrated upon the distant object to be illuminated.

In carrying out my invention I employ suitable mechanism for feeding two carbons, between which the arc is formed, toward each other so that the arc is maintained upon the extreme end of one of the carbons. In this particular application I prefer to cause the negative carbon to move at an angle to the positive carbon, which latter, when in conjunction with a condenser or other suitable lens for concentrating the rays has its end or terminal arranged as the focus of the lens. By arranging the negative carbon to feed toward the end of the positive carbon and only moving the positive carbon to compensate for consumption and regulation of the arc, I am enabled to maintain the arc in the desired focal point of the condenser lens, and thereby maintain an intense beam of light of substantially constant brilliancy upon the object. The positive carbon is directly actuated by suitable electric regulating devices for maintaining the brilliancy of the arc, and said electric devices, as well as the positive carbon and its holder, are preferably fed bodily upon the supporting frame toward the negative carbon with a speed commensurate with the consumption of the positive carbon, and preferably independently of the consumption of the negative carbon.

Another feature of my invention comprehends the employment of means to rapidly rotate the positive carbon while the arc is formed between it and the negative carbon, the said rotation being carried on simultaneously with the feeding operation of the carbon and the electric regulation thereof. This rotation of the positive carbon during the maintenance of the arc causes the end of the said positive carbon to become luminous with the same brilliancy throughout its entire circumference, and in practice causes the end to be absolutely uniform and to emit the rays of light with uniform brilliancy throughout the surface inclosed within the circle of the end. It prevents the formation of a crater to one side of the carbon which would produce more or less defective operation and loss of useful rays of light. The electric motor which is employed to rotate the positive carbon is also employed to feed the positive carbon and its regulating device upon the supporting frame, the said latter operation being intermittent and under the control of the electric regulator. The condenser lens is supported upon a sliding adjustable frame carried upon the supporting frame and is adapted to readily move the said lens to or from the arc and thereby cause the beam of light to spread or condense with a maximum brilliancy at different distances from the lamp as desired. In the construction herein set out the negative carbon is caused to move toward the positive carbon carried by mechanism moved by the apparatus carrying the positive carbon and its electric regulator, and the speed of movement of the said negative carbon relative to the speed of movement of the positive carbon to compensate for the consumption of the said carbons may be varied by a simple adjusting device. This is most important in practice for I have found that the density of the carbons, no matter how carefully made, varies to a more or less degree and often causes the negative carbon to burn away too slowly or too fast, the first defect being to extinguish the lamp, while the second defect is to cause the negative carbon to project over the end of the positive carbon and thus obstruct more or less of the rays of light. By my present construction, if the negative carbon should be seen to feed too fast or too slow for its consumption, the turning of a thumb screw will cause it to move with exactly the right velocity to correspond to the density of the carbon. The adjustment can be made instantly and without interfering in the slightest with the general operation of the lamp. The lamp proper is pivoted upon a base through the media of transverse and vertical axes, the latter being in a vertical shaft carried by the pedestal or base and provided with a vertical guide with which is combined a clutch and a connecting device between the said clutch and the supporting frame of the lamp. By this means the lamp may be oscillated to any position desired upon its transverse axis and locked in said position and at the same time be free to swing about its vertical axis.

My invention comprehends various details of construction all of which are fully set out in the following specification, and will be better understood by reference to the accompanying drawings, in which—

Figure 2:
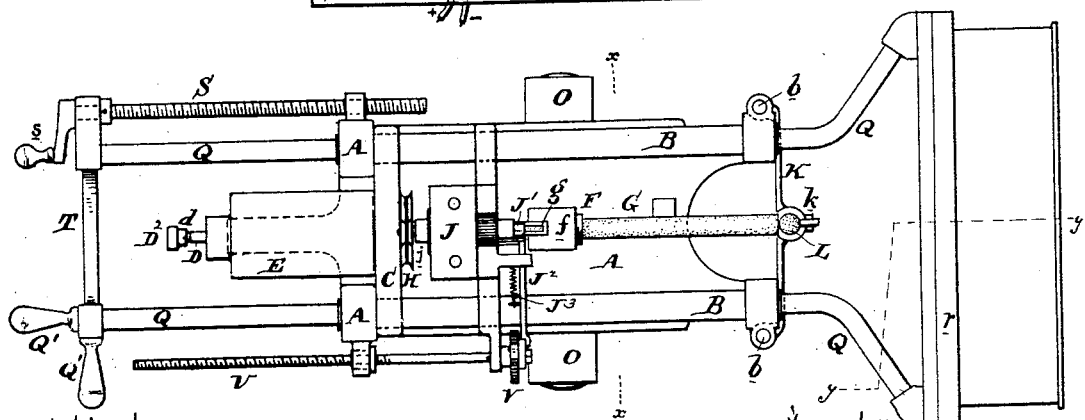

Figure 1 is a side elevation, with the condenser lens in section on line $y-y$ of Fig. 2, of a search light embodying my invention. Fig. 2 is a plan view of same. Fig. 3 is a vertical sectional elevation on line $x-x$ of Fig. 2 with the pedestal removed. Fig. 4 is a diagram illustrating the various electric circuits of the lamp. Fig. 5 is an elevation of the means for feeding the positive carbon and its regulator toward the negative carbon. Fig. 6 is a side elevation of a portion of the apparatus for controlling the operation of the power devices shown in Fig. 5; and Fig. 7 is a sectional elevation through a portion of the feeding devices.

A is the supporting frame and is pivoted to a U shaped frame O upon a transverse axis so as to be free to rock thereon. The U shaped frame O is provided with a vertical shaft O' journaled in a pedestal or base $O^2$, the upper part of which is provided with a guide surface $O^3$ upon which supporting rollers $o$ carried by the frame O rest to reduce the friction and to permit the search light to be more readily rotated about its vertical axis. The lower part of the vertical axis or shaft O' is provided with collector rings X, X, which connect by brushes with the wires $t, t$, leading from the source of electric supply T'. It will be observed that this support enables the frame A to be moved upon both a transverse and a vertical axis for the purpose of causing the beam of light to be projected in any desired direction and be instantly changed when desired. This joint constitutes essentially a universal support.

The frame A has secured to it tubular guides B, B. Upon these tubular guides is supported a carriage C of any suitable construction having freedom of movement. A feeding screw U works in an adjustable nut $u$ carried in the frame A (see Fig. 7). By revolving the screw U the frame C is caused to move upon the guides B. The adjustable nut $u$ may be made in any suitable manner, but is preferably formed of two parts adapted to inclose the screw threaded shaft and be held in contact therewith by a thumb screw U' carried in the frame A. When it is desired to return the carriage C to the original position shown in Figs. 1 and 2, the thumb screw U' is turned to release the adjustable nut in which case the spring $u'$ causes the two parts of the nut to be separated and permit the carriage to be readily moved back without revolving the shaft U. The thumb screw U' is then turned and a further rotation of the shaft U will feed the carriage as before. The mechanism for turning the screw threaded shaft U will be described later on.

The positive carbon G is held in any suitable clamp F carried upon a rod D which is provided with a core D' and journaled in any suitable manner upon the carriage C.

E is a solenoid surrounding the core D' and is adapted to cause said core to be drawn backward to maintain the brilliancy of the arc.

The extreme end of the shaft D has a bearing at $d$ on a frame $D^2$ carried by a rod $D^3$ and adjustable thereon by a thumb screw $D^4$. The rod $D^3$ is carried in suitable guides upon the carriage C, and is provided with a tension spring $D^5$ and an adjustable nut $D^6$ of any suitable construction for varying the tension of the spring. It will be seen that the spring $D^5$ opposes the action of the solenoid E when moving the shaft D and its carbon backward, so that when the solenoid decreases in strength, the spring $D^5$ exerts itself to feed the positive carbon toward the negative carbon.

Loosely pivoted upon or concentric with the shaft D is a band wheel H provided with longitudinally projected arms $h$ which are guided in a flanged sleeve I secured to and moving with the shaft D. A small spring $i$ interposed between the flanged sleeve I and the wheel H maintains the wheel in position against the rear bearing, though this is not essential. The wheel H is rotated continuously in one direction by a suitable band passing over the grooved wheel $j$ carried upon the shaft of the motor J which is also carried by the carriage C. The electric motor J is very small as it has but a small duty to perform, to wit:—the rotation of the shaft D and its carbon G, and the automatic feeding of the carriage C upon the guides B. From the construction just described it will be evident that while the shaft is caused to rotate at a uniform speed and high velocity, the solenoid E may move the core D' to any required degree without interfering in the slightest with the rotation of the carbon.

The feeding screw U before referred to has its end, which is connected with the carriage, provided with a ratchet wheel V in which a pawl $V^2$ works. The pawl $V^2$ is carried upon the rocking arm V' which latter is rocked or reciprocated by a rod $J^2$ which extends toward the shaft of the motor J. The shaft of the motor is provided with a cam J' which under no conditions is able to strike the end of the rod $J^2$.

W is a sliding abutment rod carried at the free end of the rod $J^2$ and adapted to be projected between the cam $J'$ and the end of said rod $J^2$ so that the cam through the rod W is made to reciprocate the rod $J^2$ against the action of the spring $J^3$ (Fig. 2). The lower end of the abutment rod W is connected with a bell crank $W'$, the free arm of which is extended in the path of the reciprocating rod $D^3$ of the electric regulator (see Figs. 1 and 6). It will now be understood that as the electric motor is continuously revolving, any interposition of the abutment rod W will cause the ratchet wheel V to be rotated slowly and feed the carriage C forward upon the guides B. This movement is insured whenever the carbon G burns away to such an extent that the electric regulator can no longer feed the shaft D to compensate for its consumption. Under this condition, the rod $D^3$ will strike the bell crank $W'$ and project the abutment rod W upward. As soon as the carriage has been fed to a small extent the electric regulator instantly re-exerts itself and by moving the core $D'$ into the solenoid draws back the rod $D^3$, and the spring $c$ withdraws the abutment rod W out of contact with the cam $J'$, or to the position shown in Fig. 5, and the lamp continues to operate. It is quite evident that the feeding devices may be operated in a large variety of ways, and if desired, the electric motor J may be connected to rotate the shaft D in any other suitable manner, either through gearing or by putting the armature of the motor shaft upon the shaft D.

The forward part of the frame A is provided with two vertical guides $b$, and upon these guides is guided the frame K carrying the negative carbon holder $k$, in which the negative carbon L is clamped and held in a vertical position. I prefer to have the guides $b$ at right angles to the guides B though it is evident that this is not essential. It will, however, be productive of the best results.

M is a pivoted lever pivoted to the frame A and connected to the vertically movable frame K by an insulating link $m$. The free end of the lever M is provided with a grooved roller $M'$ which works against the under side of an oblique guide arm N which is pivoted at $n$ to the under side of the carriage C. This guide arm N may be adjusted as to its obliquity by a thumb screw $N'$ and a spring $n'$. The operating or lower edge of the guide arm may be straight or curved as desired so as to make the upward movement of the frame K as uniform as possible. By properly arranging the angle of the guide arm N the vertical feeding of the negative carbon L will be relatively correct with respect to the horizontal feeding of the positive carbon G. If the carbons L and G are of the same density and size and composition, the angle of the guide arm N should be about thirty degrees with the guides B, but this obliquity will be varied for any variations in the composition, density or size of the carbons L and G, and the said variation in the obliquity of the guide arm N may be readily accomplished by turning the adjusting screw $N'$. It is not possible always to adjust the guide arm at the start, but if the carbon L should feed up too rapidly or too slowly this is readily apparent and in an instant the proper adjustment can be made with the screw $N'$.

R is a condenser lens which may be of large diameter of the cross section shown in Fig. 1 or of the construction shown in Fig. 4. It is immaterial to my invention what form of condenser lens is employed. The lens is held in a suitable frame $r$ carried by two adjustable rods Q, Q, guided through the tubular guides B, B, of the frame A, as is clearly shown in Figs. 1, 2, and 3. The rear ends of these guide rods Q are connected by a frame T having handles $Q'$ by which the light may be readily moved upon its vertical or transverse axis. A feeding screw S having a crank handle $s$ may connect the frame T with the frame A so that by turning the said screw S the guide rods Q are adjusted in the guides B and thereby cause the condenser lens to be moved to or from the arc of the lamp, when it is desired to project a concentrated beam of light to a greater or less distance, or when it is desired to change the area over which the beam of light shall extend at any given distance. Any other suitable adjusting means may be employed if desired. The current after being received upon the collector rings X, X, passes by the conductor $l$ through the solenoid E, thence to a brush $g$ resting upon a collecting ring $f$ carried by the carbon clamp F, thence through the carbons G and L and back by a conductor $l$ to the collector rings X, as is clearly shown in Fig. 4. In practice I prefer to insulate the carbon holders F and K from the remaining portion of the apparatus so that the current only passes through the conductors and the carbons, thus avoiding in a great measure the danger of short circuits or shocks to the operators.

The electric motor J may be a series wound or shunt wound machine and is preferably connected in parallel with the carbons L G. In Fig. 4 the motor is shown as shunt wound, in which the current passes from the brush $g$ and divides through the field magnets and armature of the motor, and thence through a switch $m$ and by the conductor P to the return circuit $l$ on the other side of the arc. A regulator $e$ may be interposed in the field magnet circuit so as to interpose a varying resistance in the said field magnet circuit to vary the speed of the motor, or the said resistance regulator $e$ may be arranged in series with the motor, as indicated by the dotted lines in Fig. 4, in which case the current after passing through the armature and field, unites, then passes through the regulator $e$, through the switch $m$, and to the return circuit $l$. The regulator $e$ may be of such construction that after interposing all the resistance to slow down the motor, the circuit may be broken by moving the slide of the regulator to the last notch. If the motor is to be suddenly cut out of circuit, the switch m may be employed. The particular kind of motor is immaterial, as all that is required is to have a small motor running continuously and adapted to perform the feeding operations as well as the rotation of the carbon.

It is evident that my invention does not necessitate the rotation of the carbon G, for without this rotation the lamp would be far superior in its operation to the usual construction employing two vertical carbons, and to so modify the operation of the apparatus it would simply be necessary to throw off the belt between the wheels j and H, the function of the other parts remaining the same as before.

An inclosing case Z may be employed to shield the apparatus if desired. The case is shown in dotted lines in Fig. 1 and in full lines in Fig. 3.

While the transverse axis between the frame A and frame O is shown as below the center of gravity of the lamp proper, it is quite evident that it may be located higher up or at any elevation desired.

The frame O is provided with a downwardly extending guide $O^4$ provided with a clamp or clutch P'. The free end of this clutch P' is connected with the lower end of a bar P hinged at its upper end to the frame A. The lever $P^2$ carried by the bar P and the link $P^3$ connecting with the clutch or clamp P' may be employed to throw the clutch into or out of action after the lamp has been brought to the proper position or to liberate it for further adjustment. I do not confine myself to any particular device for making this adjustment.

No provision has been shown in this apparatus for vibrating the beam of light, but it is quite evident that the said beam of light may be vibrated, for example, in the manner and for the purpose set out in Letters Patent No. 495,461, granted to me on April 11, 1893.

I do not confine myself to the various details here shown as they may be greatly modified without departing from the general principles of the invention.

What I claim as new, and desire to secure by Letters Patent, is—

1. In an arc lamp, the combination of two carbons arranged at an angle to each other, a source of electric energy in circuit with said carbons, means to positively move each of said carbons toward the other to compensate for consumption of the carbons, connecting devices whereby the movement of one of the carbons controls the movement of the other, and power devices to rotate one of the carbons upon its axis.

2. In an arc lamp, the combination of two carbons arranged at an angle to each other, a source of electric energy in circuit with said carbons, means to positively move each of said carbons toward the other to compensate for consumption of the carbons, connecting devices whereby the movement of one of the carbons controls the movement of the other, power devices to rotate one of the carbons upon its axis, and an electric regulator for causing a relative movement between the carbons to maintain an arc of uniform brilliancy.

3. In an arc lamp, the combination of two carbons arranged at an angle to each other, a source of electric energy in circuit with said carbons, connecting devices whereby the movement of one of the carbons controls the movement of the other, power devices to rotate one of the carbons upon its axis, an electric regulator for causing a relative movement between the carbons to maintain an arc of uniform brilliancy, and feeding devices under the control of the electric regulator for positively feeding both of the carbons toward each other.

4. In an arc lamp, the combination of two carbons arranged at an angle to each other, a source of electric energy in circuit with said carbons, regulating devices for maintaining the brilliancy of the arc, power devices to rotate one of the carbons upon its axis, and electrically controlled feeding devices for simultaneously feeding both of the carbons toward each other to compensate for consumption.

5. In an arc lamp, the combination of two carbons arranged at an angle to each other, a source of electric energy in circuit with said carbons, means to positively move each of said carbons toward the other to compensate for consumption of the carbons, connecting devices whereby the movement of one of the carbons controls the movement of the other, power devices to rotate one of the carbons upon its axis, electrically controlled feeding devices for operating the means for simultaneously feeding both of the carbons toward each other, and hand operated adjusting devices for varying the relative speed of movement of the two carbons in their movement toward each other to compensate for any variation in the rapidity of consumption.

6. In an electric lamp, the combination of two carbons arranged at an angle to each other, a source of electric energy in circuit with the said carbons, means to cause a very rapid continuous and uniform relative movement between the said carbons to bring all portions of the end of one of the carbons repeatedly and frequently within the zone of the arc whereby the arc formed between the carbons is caused to travel with great rapidity about the end of one of the carbons and maintain the entire end of the carbon at a high temperature, and feeding devices common to both carbons for feeding the two carbons toward each other to compensate for the consumption thereof.

7. In an electric lamp, the combination of two carbons arranged at an angle to each other, a source of electric energy in circuit with the said carbons, means to cause a very rapid continuous and uniform relative movement between the said carbons to bring all portions of the end of one of the carbons repeatedly and frequently within the zone of the arc whereby the arc formed between the carbons is caused to travel with great rapidity about the end of one of the carbons and maintain the entire end of the carbon at a high temperature, and automatic feeding devices for feeding the carbons toward each other with a relatively different speed whereby the arc is maintained in a fixed position.

8. In an electric lamp, the combination of two carbons arranged at an angle to each other, a source of electric energy in circuit with the said carbons, means to cause a very rapid continuous and uniform relative movement between the said carbons to bring all portions of the end of one of the carbons repeatedly and frequently within the zone of the arc whereby the arc formed between the carbons is caused to travel with great rapidity about the end of one of the carbons and maintain the entire end of the carbon at a high temperature, an electric regulator for causing a separation of the carbons for the purpose of maintaining an arc of uniform brilliancy, and automatic feeding devices for feeding the carbons toward each other with a relatively different speed whereby the arc is maintained in a fixed position.

9. In an electric lamp, the combination of two carbons arranged at an angle to each other, a source of electric energy in circuit with the said carbons, means to cause a relative movement between the said carbons whereby the arc formed between them is caused to rapidly travel about the end of one of the carbons, an electric regulator for moving one of the carbons to maintain an arc of uniform brilliancy, and adjustable spring devices for opposing the action of the regulator for the purpose of adjusting it to suit a given arc with a given current.

10. In an electric lamp, the combination of two carbons arranged at an angle to each other, a circuit including the said carbons with a source of electric energy, a support for one of the carbons, means for rotating the other carbon upon its axis, an electric regulator for moving the said rotating carbon in the direction of its axis for maintaining the brilliancy of its arc, means to positively feed the support for the first mentioned carbon toward the end of the rotating carbon, and power devices controlled by the arc for positively moving the said support.

11. In an electric lamp, the combination of two carbons arranged at an angle to each other, a circuit including the said carbons with a source of electric energy, a support for one of the carbons, means for rotating the other carbon upon its axis, an electric regulator for moving the said rotating carbon in the direction of its axis for maintaining the brilliancy of its arc, and an adjustable spring for regulating the action of the electric regulator.

12. In an electric lamp, the combination of two carbons arranged at an angle to each other, a holder for one of the carbons, means to feed it longitudinally or in the direction of its length, means for rotating the said carbon about its axis, a holder for the other carbon movable at an angle to the rotating carbon, and feeding devices common to the holders of both carbons for simultaneously feeding them toward each other.

13. In an electric lamp, the combination of two carbons arranged at an angle to each other, a holder for one of the carbons, means to feed it longitudinally or in the direction of its length, means for rotating the said carbon about its axis, a holder for the other carbon movable at an angle to the rotating carbon, feeding devices common to the holders of both carbons for simultaneously feeding them toward each other, and an electric regulator for causing a separation of the two carbons for maintaining the brilliancy of the arc.

14. In an electric lamp, the combination of two carbons arranged at an angle to each other, a holder for one of the carbons, means to feed it longitudinally or in the direction of its length, means for rotating the said carbon about its axis, a holder for the other carbon movable at an angle to the rotating carbon, feeding devices common to the holders of both carbons for simultaneously feeding them toward each other, an electric regulator for causing a separation of the two carbons for maintaining the brilliancy of the arc, and a hand operated adjusting device for controlling the action of the electric regulator.

15. In an electric lamp, the combination of the frame, a holder journaled in said frame and adapted to be rotated therein, power devices to rapidly uniformly and continuously rotate the said holder, a carbon carried by said holder, a second carbon arranged at an angle to the first mentioned carbon, a support for the second mentioned carbon, an electric circuit including both carbons, and means to positively feed the two carbons or their supports toward each other.

16. In an electric lamp, the combination of the frame, a holder journaled in said frame and adapted to be rotated therein, power devices to rapidly uniformly and continuously rotate the said holder, a carbon carried by said holder, a second carbon arranged at an angle to the first mentioned carbon, a support for the second mentioned carbon, an electric circuit including both carbons, means to positively feed the two carbon holders or their supports toward each other, and an adjustable electric regulator for causing the carbons to separate to regulate the brilliancy of the arc.

17. In an electric lamp, the combination of two cylindrical carbons arranged at an angle to each other, a source of electric energy in circuit with the said carbons, and means to cause a rapid continuous and uniform relative movement between the said carbons to bring all portions of the end of one of the carbons repeatedly and frequently within the zone of the arc whereby the arc formed between the carbons is caused to travel with great rapidity about the end of one of the carbons and maintain the entire end of the carbon at a high temperature, a condenser lens having its axis in line with the axis of the rotating carbon, suitable means to adjust the condenser lens to or from the end of the rotating carbon and a universal support whereby the lamp proper and condenser lens may be simultaneously moved to project the beam of light in various directions.

18. In an arc lamp, the combination of two carbons between which an arc is maintained, a movable carriage for feeding one of the carbons toward the other, a ratchet and screw device for feeding the carriage upon its support, an electric motor having a cam for operating the ratchet device, an electric regulator for controlling the brilliancy of the arc, and an adjustable abutment controlled by the electric regulator and adapted to be introduced between the cam and ratchet device to control the feeding of the carriage.

19. In an arc lamp, the combination of two carbons between which an arc is maintained, a movable carriage for feeding one of the carbons toward the other, a ratchet and screw device for feeding the carriage upon its support, an electric motor having a cam for operating the ratchet device, an electric regulator for controlling the brilliancy of the arc, an adjustable abutment controlled by the electric regulator and adapted to be introduced between the cam and ratchet device to control the feeding of the carriage, and connecting feeding devices between the carriage and the second carbon holder to cause the latter to move its carbon toward the carbon carried by the carriage with a speed commensurate with its consumption.

20. In an arc lamp, the combination of two carbons between which an arc is maintained, a movable carriage for feeding one of the carbons toward the other, a ratchet and screw device for feeding the carriage upon its support, an electric motor having a cam for operating the ratchet device, an electric regulator for controlling the brilliancy of the arc, an adjustable abutment controlled by the electric regulator and adapted to be introduced between the cam and ratchet device to control the feeding of the carriage, connecting feeding devices between the carriage and the second carbon holder to cause the latter to move its carbon toward the carbon carried by the carriage with a speed commensurate with its consumption, and means to vary the relative speed of feeding of the two carbons.

21. In an arc lamp, the combination of two guides arranged at an angle to each other, a carriage carried upon one of the guides and provided with a carbon holder, a frame movable upon the other one of the guides and provided with a second carbon holder, an oblique guide arm carried by the carriage, a movable part connecting with the frame carrying the second carbon holder and operated by the guide arm, and power devices for feeding the carriage upon its guide.

22. In an arc lamp, the combination of two guides arranged at an angle to each other, a carriage carried upon one of the guides and provided with a carbon holder, a frame movable upon the other of the guides and provided with a second carbon holder, an oblique guide arm carried by the carriage, a movable part connecting with the frame carrying the second carbon holder and operated by the guide arm, power devices for feeding the carriage upon its guide, and an adjustable device for changing the angle of the oblique arm.

23. In an arc lamp, the combination of a frame, a shaft D journaled in said frame and provided with the carbon holder F and a core D', a solenoid E for moving the core and carbon holder, an arm $D^2$ against which the carbon holder rod D is pivoted, a rod $D^3$ connecting with the arm $D^2$, a spring $D^5$ acting upon the rod $D^3$ for the purpose of opposing the action of the solenoid, and a second carbon holder to or from which the first mentioned carbon holder moves.

24. In an arc lamp, the combination of a frame, a shaft D journaled in said frame and provided with the carbon holder F and a core D', a solenoid E for moving the core and carbon holder, an arm $D^2$ against which the carbon holder rod D is pivoted, a rod $D^3$ connecting with the arm $D^2$, a spring $D^5$ acting upon the rod $D^3$ for the purpose of opposing the action of the solenoid, a second carbon holder to or from which the first mentioned carbon holder moves, and means to adjust the tension of the spring $D^5$.

25. In an electric lamp, the combination of a frame having tubular guides, supporting rods guided in said tubular guides and carrying at one end a condenser lens, means to adjust the guide rods upon the tubular guides, and an electric lamp proper supported upon the frame and adapted to produce an arc at a fixed distance from the condenser lens.

In testimony of which invention I have hereunto set my hand.

R. M. HUNTER.

Witnesses:
ERNEST HOWARD HUNTER,
C. M. DIETTERICH.